UNITED STATES PATENT OFFICE.

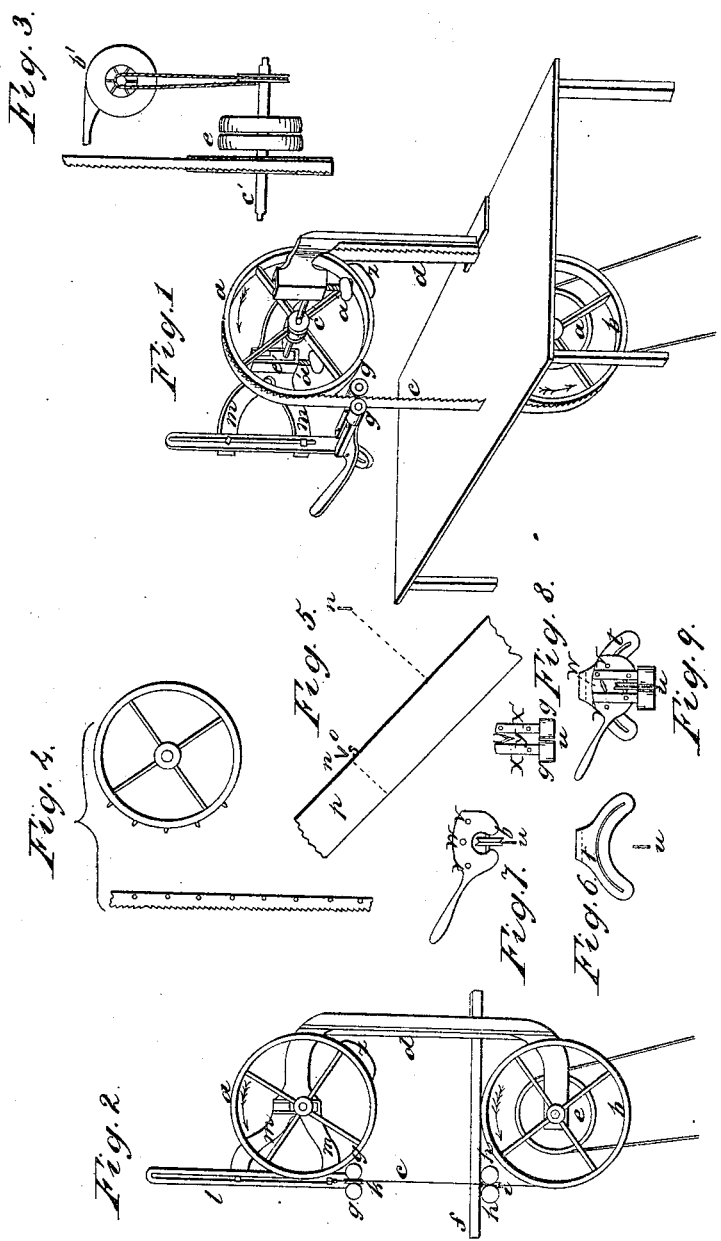
L. Hedge,
Band Saw Mill.
N° 6,432. Patented May 8, 1849.

LEMUEL HEDGE, OF NEW YORK, N. Y.

IMPROVEMENT IN SAW-MILLS.

Specification forming part of Letters Patent No. 6,432, dated May 8, 1849.

*To all whom it may concern:*

Be it known that I, LEMUEL HEDGE, of the city, county, and State of New York, have invented a new and useful improvement in machinery for sawing wood and other material capable of being sawed, including timber, boards, veneers, inlaying, scroll-work, fret-work, &c.; and I do hereby declare the following to be a full, clear, and exact description of the same, reference being had to the annexed drawings as making a part of this specification, in which similar marks refer to similar parts throughout all the figures.

My invention consists of a saw formed of a plate of steel of suitable length, thickness, and width, with the ends joined together forming a hoop, with saw-teeth properly formed and set on one edge of the hoop. This hoop is passed around two pulleys or cylinders $a$ and $b$, Figs. 1 and 2, whose axes $c'$ revolve in suitable boxes, one of which is seen at $e'$, Fig. 1. These pulleys are separated from each other a distance sufficient to cause the hoop to become straightened in the parts $c$ and $d$ and sufficiently strained, which may be effected by means of the two screws $a'$ and $a'$, Fig. 1. This hoop now becomes an endless saw and is capable of serving as a belt to communicate motion from one pulley to the other. The face of the pulleys should be at least equal in width with that of the saw and must be turned parallel with their axes. The two pulleys must revolve in the same plane. If the saw is designed to cut by a downward motion, which is the most usual and convenient, the driving-pulley $e$ must be fixed to the lower pulley $b$ or to its axis, and if the rotation of the pulleys is the direction indicated by the arrows, $c$ will be the working side of the saw. This arrangement is necessary to insure the good execution of the saw from the fact that the whole amount of resistance in this case tends to tighten and strain this side $c$ of the saw, while it proportionally slackens the opposite side $d$.

$f$, Fig. 2, represents an end section of the bench through which the saw passes, and substances resting upon the top of the bench will be acted upon by the saw in its downward motion if presented to its edge.

The small friction-rollers $g$ $g$ and $h$ $h$, Fig. 2, are side guides, which serve the double purpose of preventing vibration or shaking in the working portions of the saw, and also to give the right inclination to the edge in order to cause it to run on the line or in the desired direction. The rollers $i$ and $k$ turn in a direction transverse to that of $g$ $g$ and $h$ $h$. They are applied to the back of the saw, having a V-shaped groove formed on their faces to receive it, and are designed to counteract the force which must necessarily be applied against the edge in feeding up the work, thus preventing the saw from being forced off of the main pulleys $a$ and $b$. One of these sets of rollers $h$ $h$ and $i$ are stationed immediately beneath the bench, and another set $g$ $g$ and $k$ are attached to the slide $l$ for the purpose of raising or lowering them by means of said slide. The position and mode of attaching the slide $l$ to the arms $m$ $m$ of the frame may be clearly seen by inspecting Figs. 1 and 2.

As the sets of guide-rollers above mentioned are important parts in this machinery, further particulars of them will here follow.

It becomes necessary for some purposes to which this saw is applicable to turn the edge outward from its natural position twenty, forty, or more degrees. For instance, in sawing off a board of greater length than the diameter of the main pulleys $a$ and $b$ the board would come in contact with the returning side $d$ of the saw. This inconvenience may be prevented by inclining the edge of the saw outward or the back inward at the working portion of the saw, as is illustrated at Fig. 5, where $n$ $n$ are cross-sections of the saw in their natural positions and $o$ in the required inclined position, the edge of the saw $s$ retaining the same point in both cases. In this inclined position of the saw the board $p$, of any width less than the distance $q$ $r$, may be sawed off at right angles without coming in contact with the returning part of the saw at $r$. This inclined position is effected by the means of the sets of guide-rollers. To adapt them to this purpose I construct them in three parts, as follows: A plate of metal shaped like Fig. 6 is attached to the lower end of the slide $l$, Fig. 1. The dark-shaded segment of a circle $t$, Fig. 6, represents a slot extending through the plate. The center of the segment is the point $u$, which is coincident with the cutting-edge of the saw. Another plate, Fig. 7, to which the back roller $i$ or $k$ is attached, is placed upon the plate, Fig. 6, so as that the two pins $v\ v$ may enter into the slot $t$ and slide around in it. These two plates are connected together by a screw, the head of which appears at $w$. This screw passes through the slot $t$ into a nut underneath, by means of which the plate, Fig. 7, may be made fast at any point along the slot $t$. The two side rollers $g\ g$ and their axles $x$ and $x'$, Fig. 8, are to be placed upon and connected to the plate, Fig. 7, the one $x'$ permanently, the other $x$ by a single pin, on which it may turn, allowing the spring $y$ to bear the two rollers $g\ g$ firmly against the sides of the saw.

Fig. 9 is a plan of the several parts of the guide-roller apparatus when placed together.

For small machines for shop use I intend to furnish cast-iron frames cast in a single piece; but as no particular form for the frame-work is essential I may presume that an inspection of Figs. 1 and 2 will give an adequate idea of the form I have adopted, nothing further being necessary than that proper seats for the journals at the ends of the axles of the main pulleys $a$ and $b$ and also seats for the slide $l$ be provided for, and that the space $c$ and $d$ between the bench or platform and the upper pulley $a$ be kept unincumbered for the passage of the carriage and what may be upon it. For the larger patterns the frame-work of the buildings in which they are to run may be adapted to receive them.

The upper main pulley $a$ should be made as light as may be, due regard being always had to sufficient strength, as momentum acquired in revolving may in some cases endanger or slacken the working side of the saw. To prevent this or to insure this side of the saw being always strained, I purpose to apply a brake $z$ to the upper pulley, to be borne against it by a spring or a weight, as convenience may dictate.

Fig. 3 is a sectional elevation showing a mode of giving motion to a blowing apparatus $b'$. This is to be situated so as to blow against the saw immediately beneath the bench for the purpose of removing the sawdust and prevent its accumulation between the saw and the face of the pulley $b$.

Fig. 4 shows the lower pulley $b$ armed with spurs projecting from its periphery and a section of a saw pierced with corresponding holes to receive the spurs. This is designed to prevent the saw from slipping, and is to be used in machines calculated to do work so hard as to require its use.

What I claim as my invention, and desire to secure by Letters Patent, is—

The means above described to preserve, increase, and regulate the tension of the working portion of the saw when at work—viz., the application of the driving power to the lower pulley $b$ when the saw is designed to work in its downward motion and the application of the brake $z$ to the upper pulley $a$.

LEMUEL HEDGE.

Witnesses:
ADRIAN JANES,
H. E. PHELPS.